Patented Feb. 1, 1949

2,460,347

UNITED STATES PATENT OFFICE 2,460,347

PROTECTION OF FURNACES FROM SLAG

William E. Heller, Yeadon, Pa.

No Drawing. Application June 23, 1945,
Serial No. 601,341

5 Claims. (Cl. 117—104)

This invention relates to protection of furnaces and, more particularly, to the protection of furnace surfaces from the deteriorating effects of slag deposition.

Molten slag resulting from the combustion of fuel, more particularly powdered fuel, accumulates upon the surfaces of boiler tubes, plates and the like. This slag, in contact with ferrous metal under certain conditions of fuel combustion, causes a chemical corrosion attack resulting in surface deterioration or wasting of the metal. In combustion zones where such destructive conditions prevail, it is customary to apply a refractory coating to the metal surfaces to prevent direct contact between the slag and the metal. These coatings must be dense, homogeneous, impervious to slag penetration, and have adhering qualities to maintain intimate contact with the boiler metal.

Coatings of chrome ore plasticized with water-glass have been used for this purpose. It was customary to apply this material by pounding it into place with a hand mallet. That method of application produces a coating which is non-uniform, laminated, and insufficiently dense. Futhermore, the vibration from the pounding loosens the bonding of the material already placed. Also, the mixture of chrome ore and water-glass does not develop a satisfactory bond to the metal. The slag is deposited on and adheres to the coating which is distintegrated and pulled away from the metal by the slag as it flows down to the removal pit. As a result, the protection afforded has a very limited life and frequent replacement of the coating is required with consequent undesirable shut-downs of the boiler.

Among the objects of my invention are: to provide a composition of coating which has high cohesive strength and a bond to the boiler metal sufficient to prevent it from being pulled away by slag depositions; to provide a composition of coating suitable for application by a cement gun; to apply the coating material in a penetrative manner to produce a dense, homogeneous coating; and to provide a composition of material and a method for its application which will produce a refractory coating for furnace surfaces, resistant to the deteriorating effects of slag depositions.

Other objects of the present invention will appear from the following description.

I have discovered that natural chrome ore, containing chromic oxide up to approximately 30% by weight, when admixed with a rapid-hardening cement such as the calcium-aluminate cements, and ball clay (a plastic refractory clay), when mixed with water and properly applied to boiler combustion-zone surfaces, will produce a coating which resists the deteriorating effects of slag depositions.

In order to make my coating develop maximum density, homogeneity, and penetration in interstices and behind projections, I apply the mix with a cement gun under pneumatic pressure. The mixture is supplied to the gun in dry form and the proportion of water is controlled by the operator to produce the desired consistency of the plastic mixture at the surface to be coated. The air pressure may be varied to suit conditions, a pressure of 100 lbs. per sq. in. having been found generally satisfactory. The dry mix and the water are projected simultaneously in convergent streams toward the surface to be coated, and intermingle to form a plastic mixture before reaching the surface. This may be considered a method of producing a cast-in-place refractory chrome-ore concrete for protection of furnace structures.

The clay in my mix has two important functions. First, it provides a lubricative coating about the particles of chrome ore, thus facilitating their progress through the passages of the gun. Secondly, it imparts to the plastic mix greatly enhanced properties of adhesiveness and cohesiveness, providing an improved bond to iron surfaces and permitting the coating to be built up to desired thickness without diminution of final developed strength.

The composition of coating material which I prefer to use for vertical or over-hanging surfaces comprises: chrome ore, 88% by weight; ball clay, 10% by weight; and calcium-aluminate cement, 2% by weight, with sufficient water to produce a mixture satisfactory for application by the air gun.

Although this combination produces excellent results, it should be understood that the proportion of constituents can be somewhat modified and completely satisfactory applications still be obtained. As an illustration, I have found that good results may be obtained with the proportion of the constituents other than water varied between at least the following limits: chrome ore, 80 to 95% by weight; ball clay, 0 to 10% by weight; and calcium-aluminate cement, 2 to 5% by weight. Where application is to be made to floor surfaces for example, the ball clay may be eliminated entirely, a combination of chrome ore, 95% by weight; and calcium-aluminate cement, 5% by weight, producing an effective surface.

Although I have described the application of my refractory chrome-ore concrete to boiler metal surfaces, it is obvious that it may be applied in the same way to protect and/or resurface any of the furnace surfaces such as combustion-zone or ash-pit surfaces which may be subject to destructive action of slag.

I claim:

1. A cast-in-place type refractory chrome-ore concrete for protection of furnace structures against the deteriorating effects of slag depositions, comprising chrome ore 88% by weight, ball clay 10% by weight, and calcium-aluminate cement 2% by weight.

2. A method for protecting furnace combustion-zone surfaces against the deteriorating effects of slag depositions, consisting in projecting a stream of refractory chrome ore-calcium aluminate-ball clay mix on said surfaces under pneumatic pressure, said mix containing 80 to 95% chrome ore by weight, 2 to 5% calcium aluminate cement by weight and ball clay in an amount not greater than 10% by weight whereby said mix may be projected in dry form.

3. The process of applying to a surface to be coated a concrete mixture comprising 2 to 5% calcium aluminate cement by weight, 80 to 95% chrome ore by weight and not over 10% ball clay by weight, which includes the steps of mixing said ingredients in dry form and propelling a stream of the dry mixture and a stream of water simultaneously toward the surface to be coated, said streams being directed convergently to mingle before reaching said surface.

4. Ferrous metal having a coating consisting of a cast-in-place type refractory chrome ore-calcium aluminate concrete containing 80 to 95% chrome ore by weight, 2 to 5% calcium aluminate cement by weight and ball clay in an amount not greater than 10% by weight and having high cohesive strength and a good bond to the metal.

5. A cast-in-place type refractory chrome ore concrete for protection of furnace structures against the deteriorating effects of slag depositions, comprising chrome ore in the range from 80 to 95% by weight, ball clay in an amount up to 10% by weight, and calcium-aluminate cement in the range from 2 to 5% by weight.

WILLIAM E. HELLER.

REFERENCES CITED

The following references are of record in the file of this patent:

UNITED STATES PATENTS

| Number | Name | Date |
|---|---|---|
| Re. 20,117 | Power | Sept. 22, 1936 |
| 984,254 | Akeley | Feb. 14, 1911 |
| 1,583,918 | Dunn | May 11, 1926 |
| 1,595,362 | Schaefer | Aug. 10, 1926 |
| 1,602,105 | Geer et al. | Oct. 5, 1926 |
| 1,780,114 | Brown | Oct. 28, 1930 |
| 1,997,874 | Power | Apr. 16, 1935 |
| 2,051,002 | Knote | Aug. 11, 1936 |
| 2,051,003 | Knote | Aug. 11, 1936 |
| 2,077,796 | Harvey et al. | Apr. 20, 1937 |
| 2,246,226 | Walton | June 17, 1941 |

FOREIGN PATENTS

| Number | Country | Date |
|---|---|---|
| 798,492 | France | 1936 |